(12) United States Patent
Xu

(10) Patent No.: US 10,084,938 B2
(45) Date of Patent: Sep. 25, 2018

(54) READING APPARATUS AND NON-TRANSITORY STORAGE MEDIUM STORING INSTRUCTIONS EXECUTABLE BY READING APPARATUS

(71) Applicant: BROTHER KOGYO KABUSHIKI KAISHA, Nagoya-shi, Aichi-ken (JP)

(72) Inventor: Shan Xu, Nagoya (JP)

(73) Assignee: BROTHER KOGYO KABUSHIKI KAISHA, Nagoya-shi, Aichi-Ken (JP)

( * ) Notice: Subject to any disclaimer, the term of this patent is extended or adjusted under 35 U.S.C. 154(b) by 5 days.

(21) Appl. No.: 14/520,733

(22) Filed: Oct. 22, 2014

(65) Prior Publication Data
US 2015/0116789 A1    Apr. 30, 2015

(30) Foreign Application Priority Data

Oct. 31, 2013    (JP) .................. 2013-226791

(51) Int. Cl.
*G06K 15/00*    (2006.01)
*H04N 1/40*    (2006.01)
(Continued)

(52) U.S. Cl.
CPC ..... *H04N 1/40062* (2013.01); *H04N 1/00013* (2013.01); *H04N 1/21* (2013.01);
(Continued)

(58) Field of Classification Search
CPC ................................... H04N 1/40062
See application file for complete search history.

(56) References Cited

U.S. PATENT DOCUMENTS 4,933,979 A    6/1990   Suzuki et al.
5,566,252 A *  10/1996  Miyaza .................. 382/298
(Continued)

FOREIGN PATENT DOCUMENTS

JP    S63-155386 A    6/1988
JP    S63-280390 A    11/1988
(Continued)

OTHER PUBLICATIONS

Notification of Reason for Refusal dated Aug. 1, 2017 received in related application JP 2013-226791 together with an English language translation.

*Primary Examiner* — King Poon
*Assistant Examiner* — Michael Burleson
(74) *Attorney, Agent, or Firm* — Scully, Scott, Murphy & Presser, P.C.

(57) ABSTRACT

A reading apparatus includes a reading device for reading an image on a recording medium and generating image data. The reading apparatus is configured to: receive the generated image data; retrieve a first region location indicator indicating a location of a first region to be defined on an image based on the generated image data, a second region location indicator indicating a location of a second region, a first image processing indicator indicating at least one image processing determined for the first region, and a second image processing indicator indicating at least one image processing determined for the second region; determine first partial image data based on the first region location indicator; execute the at least one image processing; determine second partial image data; and execute the at least one image processing.

5 Claims, 10 Drawing Sheets

(51) Int. Cl.
*H04N 1/00* (2006.01)
*H04N 1/407* (2006.01)
*H04N 1/21* (2006.01)

(52) U.S. Cl.
CPC ... *H04N 1/4072* (2013.01); *H04N 2201/0081* (2013.01); *H04N 2201/0094* (2013.01)

(56) References Cited

U.S. PATENT DOCUMENTS

| | | | |
|---|---|---|---|
| 8,094,946 B2* | 1/2012 | Maeda et al. | 382/209 |
| 2006/0268366 A1* | 11/2006 | Chen | H04N 1/4095 358/474 |
| 2009/0238625 A1* | 9/2009 | Ming | G06K 9/00449 400/76 |
| 2009/0327934 A1* | 12/2009 | Serpico et al. | 715/764 |
| 2011/0023022 A1* | 1/2011 | Harper et al. | 717/170 |
| 2013/0186957 A1* | 7/2013 | Endo | G06K 7/12 235/469 |

FOREIGN PATENT DOCUMENTS

| | | |
|---|---|---|
| JP | 11-308438 A | 11/1999 |
| JP | 2008-042259 A | 2/2008 |
| JP | 2009-027221 A | 2/2009 |

\* cited by examiner

MAIN SCANNING DIRECTION ⊗ → SUB-SCANNING DIRECTION

FIG.4A

| LOCATION | ATTRIBUTE |
|---|---|
| (4, 10)−(10, 15) | CHARACTER 1 |
| (10, 10)−(16, 15) | CHARACTER 1 |
| (4, 15)−(16, 15) | CHARACTER 2 |
| (7, 18)−(13, 23) | IMAGE |

FIG.4B

| ATTRIBUTE | IMAGE PROCESSING |
|---|---|
| IMAGE | 8-BIT CONVERSION |
| CHARACTER 1 | BINARY CONVERSION |
| CHARACTER 2 | BINARY CONVERSION AND WIDTH INCREASE |

| LOCATION | IMAGE PROCESSING |
|---|---|
| (4, 10)−(10, 15) | BINARY CONVERSION |
| (10, 10)−(16, 15) | BINARY CONVERSION |
| (4, 15)−(16, 15) | BINARY CONVERSION AND WIDTH INCREASE |
| (7, 18)−(13, 23) | 8-BIT CONVERSION |

READING APPARATUS AND NON-TRANSITORY STORAGE MEDIUM STORING INSTRUCTIONS EXECUTABLE BY READING APPARATUS

CROSS REFERENCE TO RELATED APPLICATION

The present application claims priority from Japanese Patent Application No. 2013-226791, which was filed on Oct. 31, 2013, the disclosure of which is herein incorporated by reference in its entirety.

BACKGROUND

Technical Field

The present invention relates to a reading apparatus configured to read an image and to a non-transitory storage medium storing a plurality of instructions executable by a processor of the reading apparatus.

Description of the Related Art

There have been known techniques of facial recognition and character recognition (such as optical character recognition or OCR) for a scanned image.

SUMMARY

A facial region and a character region on an image need to be identified for the facial recognition or the OCR. However, it is difficult to identify the facial region and the character region on the image, so that recognition processing may be complicated, and in worse case the recognition may fail, making it impossible to execute an appropriate processing on each region.

This invention has been developed to provide a reading apparatus and a non-transitory storage medium storing a plurality of instructions executable by a processor of the reading apparatus, each capable of executing an appropriate image processing for each region without complicated processing.

The present invention provides a reading apparatus including: a reading device configured to read an image on a recording medium and generate image data based on a read signal; a processor; and a memory configured to store a plurality of instructions. When executed by the processor, the plurality of instructions cause the reading apparatus to perform: receiving the generated image data from the reading device; retrieving, from a storage device, a first region location indicator indicating a location of a first region to be defined on an image based on the generated image data, a second region location indicator indicating a location of a second region to be defined on the image based on the generated image data, a first image processing indicator indicating at least one image processing determined for the first region, and a second image processing indicator indicating at least one image processing determined for the second region; determining first partial image data, which is a part of the generated image data, based on the first region location indicator; executing the at least one image processing, which is indicated by the retrieved first image processing indicator, for the first partial image data; determining second partial image data, which is a part of the generated image data, based on the second region location indicator; and executing the at least one image processing, which is indicated by the retrieved second image processing indicator, for the second partial image data.

The present invention also provides a reading apparatus including: a reading device configured to read an image on a recording medium and generate image data based on a read signal; a processor; and a memory configured to store a plurality of instructions. When executed by the processor, the plurality of instructions cause the reading apparatus to perform: receiving the generated image data from the reading device; acquiring, based on an identification mark detected on an image based on the received image data, (i) a first region location indicator indicating a first location defined on the image and a second region location indicator indicating a second location defined on the image and (ii) a first image processing indicator indicating at least one image processing determined for the first region and a second image processing indicator indicating at least one image processing determined for the second region; determining first partial image data, which is a part of the generated image data, based on the acquired first region location indicator; executing the at least one image processing, indicated by the acquired first image processing indicator, for the first partial image data; determining second partial image data, which is a part of the generated image data, based on the acquired second region location indicator; and executing the second image processing, indicated by the acquired second image processing indicator, for the second partial image data.

The present invention also provides a non-transitory storage medium storing a plurality of instructions executable by a processor of a reading apparatus. The reading apparatus includes a reading device configured to read an image on a recording medium and generate image data based on a read signal. When executed by the processor, the plurality of instructions cause the reading apparatus to perform: receiving the generated image data from the reading device; retrieving, from a storage device, a first region location indicator indicating a location of a first region to be defined on an image based on the generated image data, a second region location indicator indicating a location of a second region to be defined on the image based on the generated image data, a first image processing indicator indicating at least one image processing determined for the first region, and a second image processing indicator indicating at least one image processing determined for the second region; determining first partial image data, which is a part of the generated image data, based on the first region location indicator; executing the at least one image processing, which is indicated by the retrieved first image processing indicator, for the first partial image data; determining second partial image data, which is a part of the generated image data, based on the second region location indicator; and executing the at least one image processing, which is indicated by the retrieved second image processing indicator, for the second partial image data.

The present invention also provides a non-transitory storage medium storing a plurality of instructions executable by a processor of a reading apparatus. The reading apparatus includes a reading device configured to read an image on a recording medium and generate image data based on a read signal. When executed by the processor, the plurality of instructions cause the reading apparatus to perform: receiving the generated image data from the reading device; acquiring, based on an identification mark detected on an image based on the received image data, (i) a first region location indicator indicating a first location defined on the image and a second region location indicator indicating a second location defined on the image and (ii) a first image processing indicator indicating at least one image processing determined for the first region and a second image processing indicator indicating at least one image processing determined for the second region; determining first partial image data, which is a part of the generated image data, based on the acquired first region location indicator; executing the at least one image processing, indicated by the acquired first image processing indicator, for the first partial image data; determining second partial image data, which is a part of the generated image data, based on the acquired second region location indicator; and executing the second image processing, indicated by the acquired second image processing indicator, for the second partial image data.

BRIEF DESCRIPTION OF THE DRAWINGS

The objects, features, advantages, and technical and industrial significance of the present invention will be better understood by reading the following detailed description of the embodiments of the invention, when considered in connection with the accompanying drawings, in which:

FIGS. 4A and 4b are views each illustrating the template database illustrated in FIG. 2;

DETAILED DESCRIPTION OF THE EMBODIMENTS

<First Embodiment>

Hereinafter, there will be described an image recording apparatus according to a first embodiment of the present invention by reference to the drawings. In the present embodiment, the present invention is applied to a multi-function peripheral (MFP) having a scanning function and a printing function.

Figure 1:
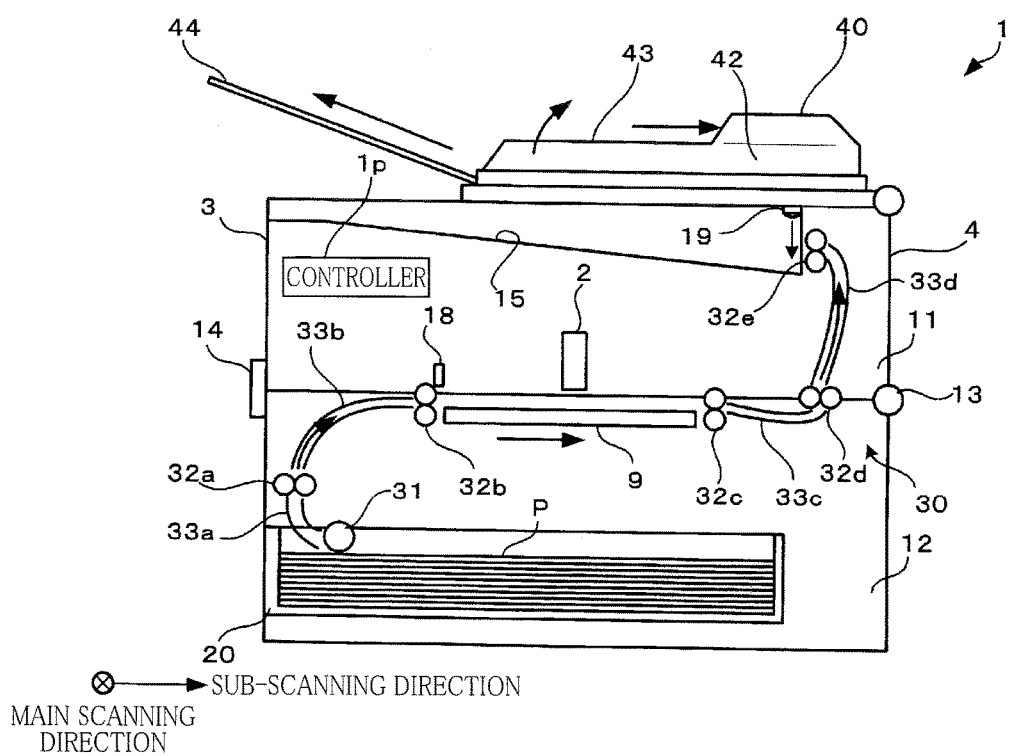
FIG. 1 is a schematic side view illustrating an internal structure of a multi-function peripheral (MFP) according to a first embodiment of the present invention.

As illustrated in FIG. 1, an MFP 1 includes an upper housing 11 and a lower housing 12 each having a rectangular parallelepiped shape. The MFP 1 has a front surface 3 (a left surface in FIG. 1) and a rear surface 4 (a right surface in FIG. 1). The upper housing 11 is open in its lower side, and the lower housing 12 is open in its upper side. The upper housing 11 is coupled to the lower housing 12 so as to be pivotable about a pivot shaft 13 with respect to the lower housing 12. An upper surface of the upper housing 11 includes a sheet support portion 15. Sheets P printed and discharged are sequentially placed onto the sheet support portion 15. A sheet output sensor 19 is disposed upstream of the sheet support portion 15 in a direction in which the sheets P are discharged onto the sheet support portion 15. The sheet output sensor 19 is a reflective sensor which outputs a signal based on the presence or absence of the sheet or sheets P placed on the sheet support portion 15. The sheet output sensor 19 outputs an ON signal to a controller 1p when there is any sheet on the sheet support portion 15, and the sheet output sensor 19 outputs an OFF signal to the controller 1p when there is no sheets on the sheet support portion 15.

An ink-jet head 2, a sheet tray 20, a conveying mechanism 30, and a platen 9 are provided in the MFP 1.

The ink-jet head 2 has a lower surface as an ejection surface which is formed with a multiplicity of nozzles for ejecting ink droplets. The sheet tray 20 can support a plurality of sheets P stacked on each other. The sheet tray 20 is removably disposed on a bottom surface of the lower housing 12. The platen 9 is a plate member for supporting a sheet and fixed to the lower housing so as to face the ejection surface of the ink jet head 2 when the upper housing 11 is closed.

The conveying mechanism 30 forms a sheet conveyance path extending from the sheet tray 20 to the sheet support portion 15 via a position between the ink-jet head 2 and the platen 9. The conveying mechanism 30 includes a pickup roller 31, nip rollers 32a-32e, and guides 33a-33d. The pickup roller 31 supplies an uppermost one of the sheets P stacked on the sheet tray 20. The nip rollers 32a-32e are disposed along the conveyance path to convey the sheet P. The guides 33a-33d are disposed on the conveyance path between the pickup roller 31 and the nip rollers 32a-32e. Each of the guides 33a-33d guides the sheet P until the sheet P conveyed by a corresponding one of the nip rollers 32a-32e reaches the next one of the nip rollers 32a-32e. When the sheet P passes through a print area located between the ink-jet head 2 and the platen 9, the ink-jet head 2 ejects ink droplets onto the sheet P from the nozzles to record an image on the sheet P. After printing, the sheet P is further conveyed by the conveying mechanism 30 and placed onto the sheet support portion 15.

A sheet sensor 18 is disposed just downstream of the nip roller 32b in the conveyance path. When a downstream or leading edge portion of the sheet P in the conveying direction passes through the sheet sensor 18, the output signal produced by the sheet sensor 18 is changed. The timing of this change determines the timing of ejection of the ink droplets from the nozzles of the ink-jet head 2.

A scanner unit 40 is provided on the upper surface of the upper housing 11 so as to partly cover the sheet support portion 15. The scanner unit 40 includes a feeder 42 and a contact image sensor (CIS) 41 (see FIG. 2) which is disposed near a document to be conveyed through a conveyance path formed by the feeder 42. A sheet-supply tray 43 is formed on an upper surface of the feeder 42. A recording medium in the form of a document set on the sheet-supply tray 43 is conveyed rightward in FIG. 1 by the feeder 42 and, at a right edge portion of the feeder 42, makes a lateral U-turn so as to be turned upside down. The flipped document then passes through an upper surface of the CIS 41 and is discharged onto a sheet-output tray 44 from a left portion of the feeder 42 in FIG. 1. When the recording medium passes through a position near the CIS 41, the CIS 41 reads an image recorded on the recording medium and outputs a read signal to an A/D converter 45 (see FIG. 2). The A/D converter 45 converts the read signal from analog to digital and stores the digital read signal into a RAM 53. Thus, a plurality of documents can be stacked on the sheet-supply tray 43, and these documents can be read successively.

Figure 2:
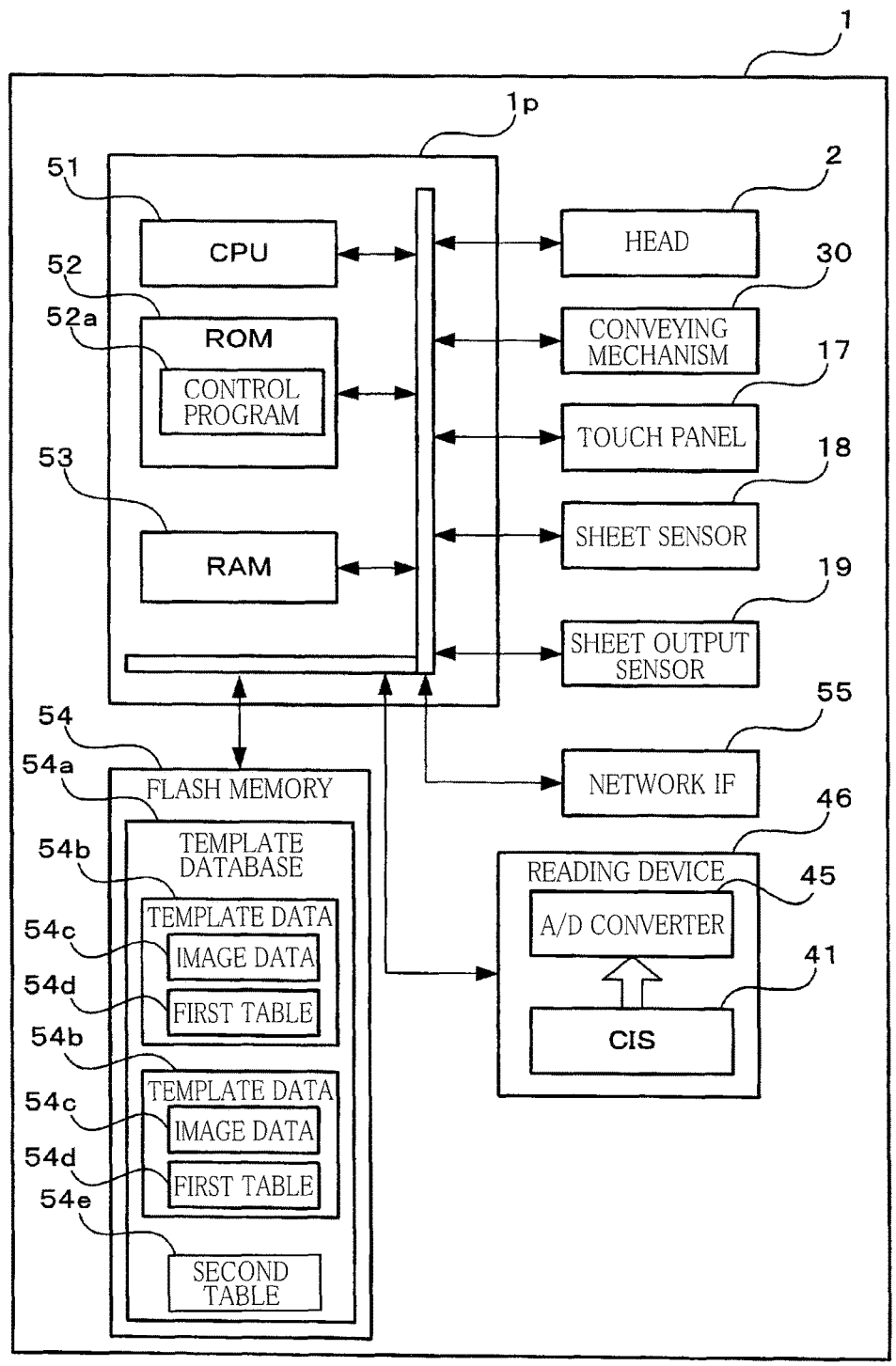
FIG. 2 is a functional block diagram illustrating the MFP illustrated in FIG. 1.

The MFP 1 includes the controller 1p. As illustrated in FIG. 2, the controller 1p includes a CPU 51, a ROM 52, and the RAM 53. The controller 1p is electrically connected to the head 2, the conveying mechanism 30, the CIS 41, the A/D converter 45, the scanner unit 40, a touch panel 17, the sheet sensor 18, and the sheet output sensor 19. The CIS 41 and the A/D converter 45 constitutes a reading device 46.

The touch panel 17 is a user interface having an input function and a display function. The touch panel 17 displays operations of the MFP 1 and receives an input operation performed by a user.

Software and information stored in the ROM 52 include: firmware as a control program 52a for controlling the MFP 1; various settings; and initial values. The RAM 53 and a flash memory 54 are used as working areas where various control programs are read out or as storage areas for temporarily storing data. The flash memory 54 stores a template database 54a which will be described below. The flash memory 54 stores an IP (Internet Protocol) address as information unique to the MFP 1.

The CPU 51 controls the devices and components of the MFP 1 according to the control program 52a read from the ROM 52 and signals transmitted from various sensors, while storing results of processings into the RAM 53 or the flash memory 54.

A network interface 55 transmits and receives data to and from various devices connected to the same local area network (LAN) as used by the MFP 1. Either of wireless communication and wired communication may be used for transmitting and receiving the data.

The MFP 1 can execute the control program 52a to execute various processings according to commands received via the touch panel 17 or commands received from a personal computer (PC) via the network interface 55. The processings include a scan processing, a print processing, a template-data registering processing, and a completed-card-image creating processing. Upon execution of the scan processing, a document set on the scanner unit 40 is read by the CIS 41, and a created read signal is converted from analog to digital by the A/D converter 45, so that image data is created from an image formed on the document. The created image data is stored into the storage device such as the RAM 53 of the MFP 1 or transmitted, via the network interface 55, to a device having output a command or to a device designated by the user. Upon execution of the print processing, the head 2 records an image on a sheet based on image data received with a command.

Figure 3:
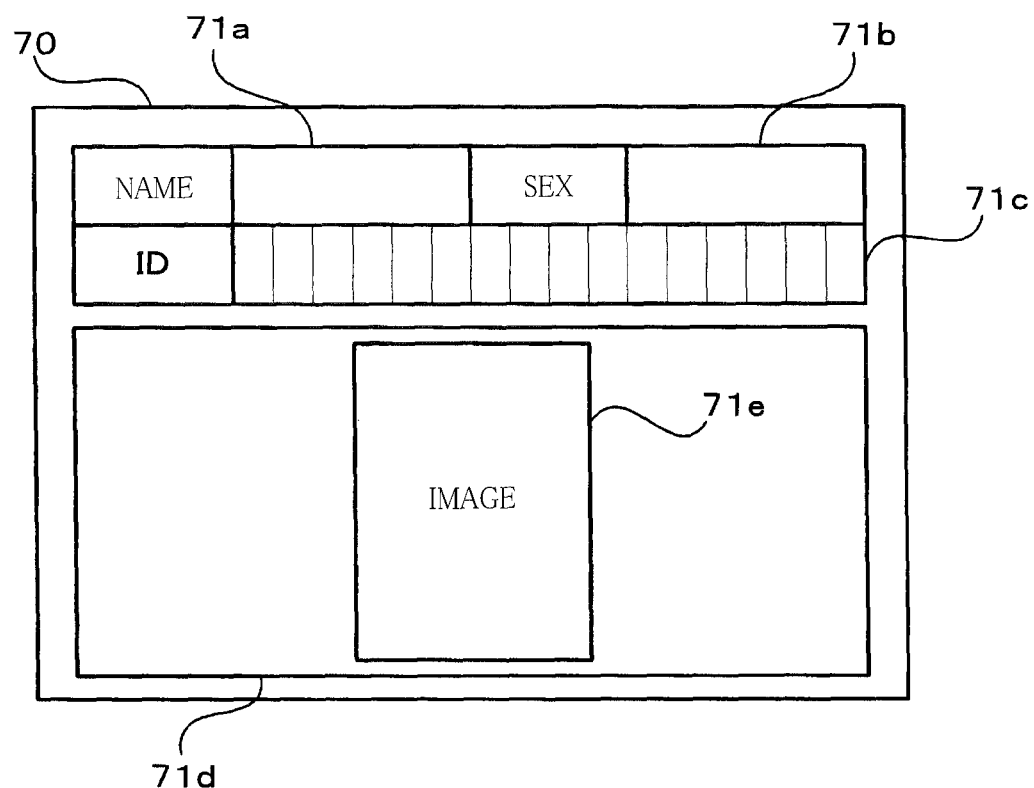
FIG. 3 is a view illustrating a card corresponding to a template database illustrated in FIG. 2.

There will be next explained the template-data registering processing, the completed-card-image creating processing, and the completed-card-image creating processing with reference to FIGS. 3, 4A and 4B. In the template-data registering processing, as illustrated in FIG. 3, image data 54c for recording a card 70 having input fields (regions) 71a-71e and template data 54b constituted by a first table 54d representing attributes of the input fields (regions) 71a-71e are registered into the template database 54a. The user thereafter chooses a desired one of the image data 54c contained in the template data 54b registered in the template database 54a and prints the card 70. The user fills in a character or characters and pastes an image or a photograph on the input fields 71a-71e of the printed card 70 to complete the card 70. The template database 54a includes: the template data 54b containing the image data 54c representative of the card 70 and the first table 54d (FIG. 4A) representing a relationship between location (two-dimensional coordinates) information about the input fields 71a-71e defined on the card 70 and attributes (each as one example of an image processing indicator in the present embodiment) representing types of inputs on the respective input fields 71a-71e; and a second table 54e (FIG. 4B) representing a relationship between the attributes and types of image processings. In the template-data registering processing, template data 54b constituted by image data 54c representative of a new card 70 and a first table 54d corresponding to the image data is additionally registered.

In the completed-card-image creating processing, the CPU 51 executes the scan processing on the card 70 to create image data and executes an appropriate image processing on the created image data. The CPU 51 refers to the first table 54d and the second table 54e to execute an appropriate image processing on region image data which is a part of image data representing an image to be recorded on the card and which corresponds to the input fields 71a-71e. Specifically, the CPU 51 executes binary conversion (e.g., an OCR processing), as the image processing, for facilitating character recognition, on the region image data representative of the input fields 71a, 71b, 71d on which a character or characters are to be input (ATTRIBUTE: CHARACTER 1). On the region image data representative of the input field 71c on which characters are to be input, the CPU 51 executes the binary conversion and then executes an image processing of increasing a line width of each character (as one example of a width change processing) for increase in viewability of the characters (ATTRIBUTE: CHARACTER 2). On the region image data representative of the input field 71e on which an image or a photograph is to be pasted, the CPU 51 executes 8-bit conversion (i.e., 256-value conversion), as the image processing, not causing much deterioration of viewability of the image (ATTRIBUTE: IMAGE). It is noted that in a case where a certain input field partly or completely overlaps another input field, an image processing to be executed is determined based on priorities of the attributes. In the present embodiment, the priorities of the attributes are set as follows: IMAGE>CHARACTER 2>CHARACTER 1. In the card 70 illustrated in FIG. 3, a part of the input field 71d overlaps the entire region of the input field 71e. In this case, since the input field 71e is associated with "IMAGE", the 8-bit conversion is executed, on a priority basis, on a part of region image data representing the input field 71d, which part corresponds to a region overlapping the input field 71e.

Figure 5:
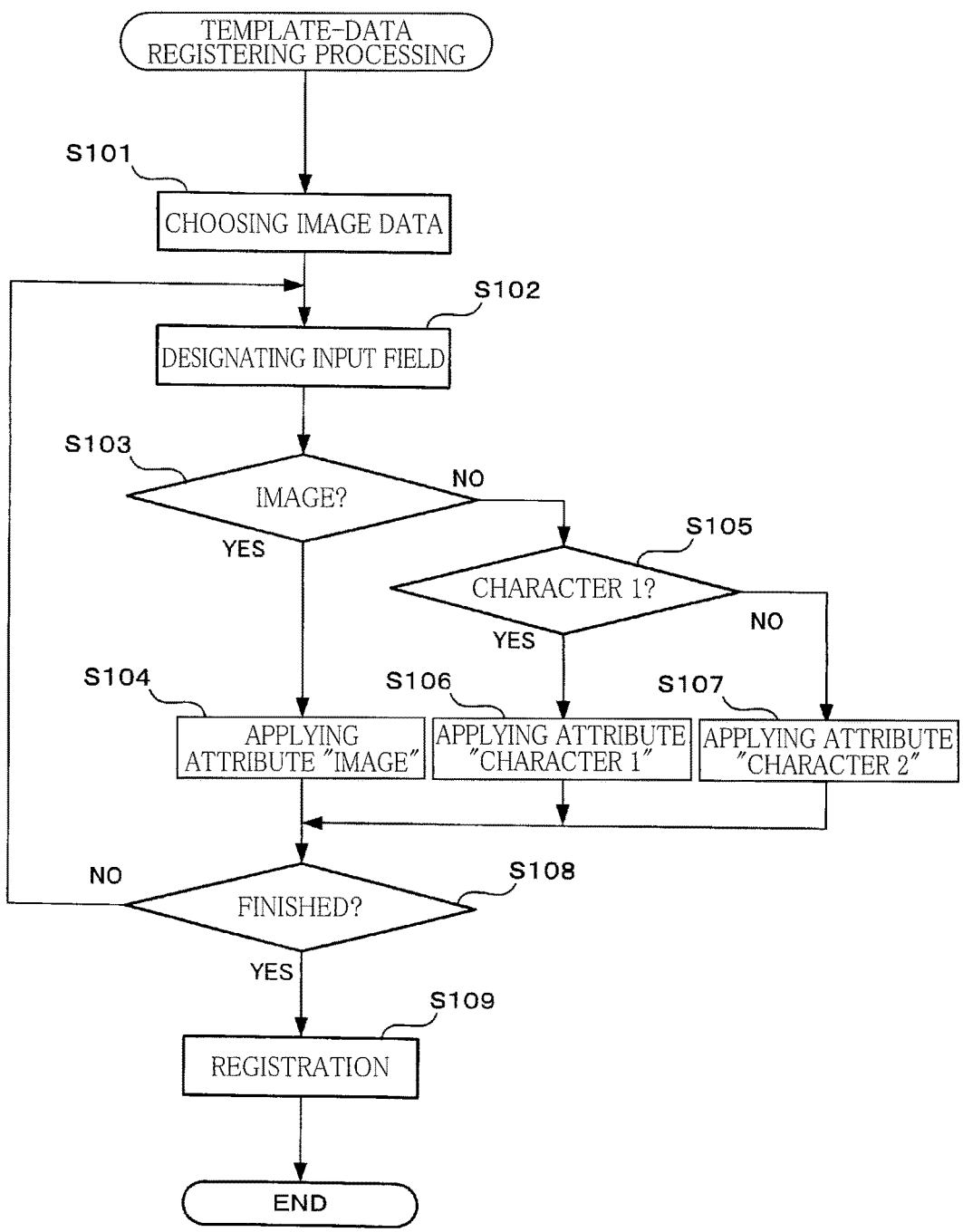
FIG. 5 is a flow chart illustrating a procedure of operations in a template-data registering processing to be executed by a control program illustrated in FIG. 2.

There will be next explained an procedure of operations in the template-data registering processing with reference to FIG. 5. This template-data registering processing begins with S101 at which the CPU 51 controls the touch panel 17 to display a list of image data which can be registered as template data, and prompts the user to choose one of the image data which is to be registered. It is noted that the image data which can be registered may be stored in advance in, e.g., the flash memory 54 and may be received from an external device via the network interface 55.

When one of the image data is chosen by the user, the CPU 51 at S102 displays the detail of the chosen image data on the touch panel 17 and prompts the user to touch the touch panel 17 to designate one of the input fields. The user may designate the input field by directly touching the input field displayed on the touch panel 17 or by inputting coordinate data. As a result of the touch operation by user, location information of the input field is determined. The CPU 51 at S103 prompts the user to choose the attribute of the input field (IMAGE, CHARACTER 1, or CHARAC- TER 2) and determines whether the chosen attribute is IMAGE or not. When the attribute chosen by the user is IMAGE (S103: YES), the CPU 51 at S104 applies the attribute "IMAGE" to the input field. When the attribute chosen by the user is not IMAGE (S103: NO), the CPU 51 at S105 determines whether the attribute chosen by the user is CHARACTER 1 or not. When the attribute chosen by the user is CHARACTER 1 (S105: YES), the CPU 51 at S106 applies the attribute "CHARACTER 1" to the input field. When the attribute chosen by the user is not CHARACTER 1 (S105: NO), the CPU 51 at S107 applies the attribute "CHARACTER 2" to the input field. The CPU 51 at S108 inquires of the user whether the user finishes designation of the input field or not. When the designation is not finished (108: NO), this flow returns to S102. When the designation is finished (S108: YES), the CPU 51 at S109 registers, as the template data 54b, the image data chosen as the image data 54c and the first table 54d representing a relationship between the location information and the attributes related for all the input fields designated for the image data, and this flow ends.

Figure 6:
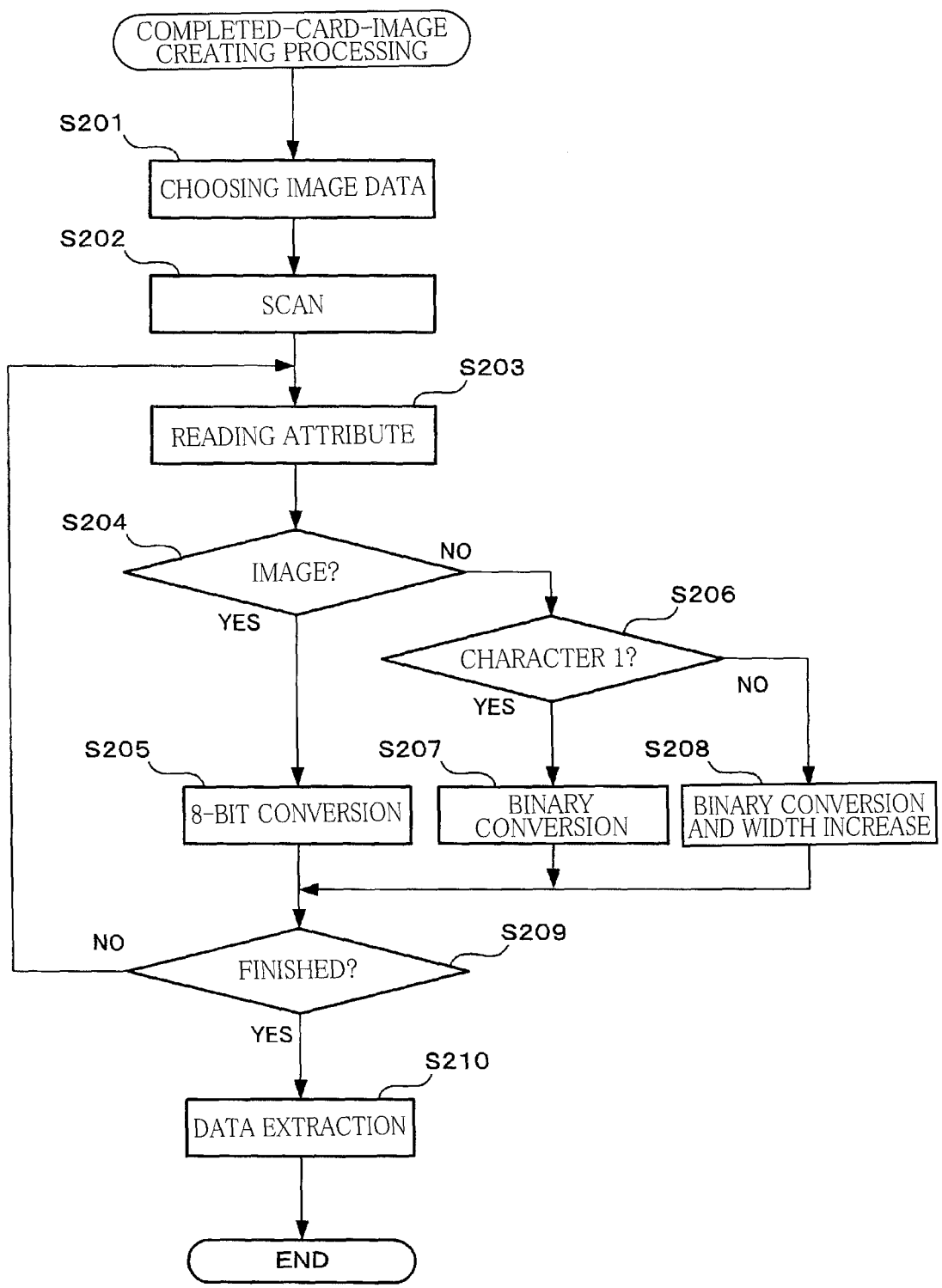
FIG. 6 is a flow chart illustrating a procedure of operations in a completed-card-image creating processing to be executed by the control program illustrated in FIG. 2.

There will be next explained a procedure of operations in the completed-card-image creating processing with reference to FIG. 6. The completed-card-image creating processing is started by an instruction of the user after the filled-in card 70 is set on the scanner unit 40. The completed-card-image creating processing begins with S201 at which the CPU 51 at S201 controls the touch panel 17 to display a list of images based on the image data 54c contained in the template data 54b registered in the template database 54a and prompts the user to choose an image created based on the image data 54c used for printing of the card 70 set on the scanner unit 40. The CPU 51 at S202 executes the scan processing and creates image data representative of the card 70.

The CPU 51 at S203 reads an attribute of one input field by referring to the image data 54c representative of the image chosen at S201 and the first table 54d contained in the template data 54b. The CPU 51 at S204 determines whether the attribute of the input field is IMAGE or not. When the attribute of the input field is IMAGE (S204: YES), the CPU 51 at S205 executes the 8-bit conversion, as the image processing corresponding to the attribute, on region image data representative of the created image data which corresponds to the input field. When the attribute of the input field is not IMAGE (S204: NO), the CPU 51 at S206 determines whether the attribute of the input field is CHARACTER 1 or not. When the attribute of the input field is CHARACTER 1 (S206: YES), the CPU 51 at S207 executes the binary conversion, as the image processing corresponding to the attribute, on the region image data corresponding to the input field. When the attribute of the input field is not CHARACTER 1 (S206: NO), the CPU 51 at S208 executes the binary conversion and increase in width, as the image processing corresponding to the attribute, on the region image data corresponding to the input field. The CPU 51 at S209 refers to the first table 54d to determine whether the image processing is finished for all the input fields or not. When the image processing is not finished for all the input fields (209: NO), this flow returns to S203. When the image processing is finished for all the input fields (209: YES), the CPU 51 at S210 extracts the region image data to which the attribute "IMAGE" is applied and extracts text data by executing the OCR processing for the binary-converted region image data to which the attributes "CHARACTER 1" and "CHARACTER 2" are applied, and this flow ends.

In the MFP 1 according to the present embodiment described above, the template database 54a stores the location information about each input field and the appropriate image processing for each input field which are associated with each other via the attribute. Accordingly, the CPU 51 can execute an appropriate image processing for each input field defined on the read image without complication of the processings.

The multi-value conversion is assigned to the attribute "IMAGE", and the binary conversion to the attributes "CHARACTER 1" and "CHARACTER 2", thereby improving the viewability of characters without deteriorating the viewability of image.

For the attribute "CHARACTER 2", the CPU 51 executes the binary conversion and then increases line width, thereby further improving the viewability of characters.

In the case where the input field partly or completely overlaps another input field, a higher priority is given to the attribute "IMAGE" than the attribute "CHARACTER 1" or "CHARACTER 2" on the data corresponding to the overlapping region, resulting in reduction in deterioration of the viewability of image.

<Second Embodiment>

Figure 7:
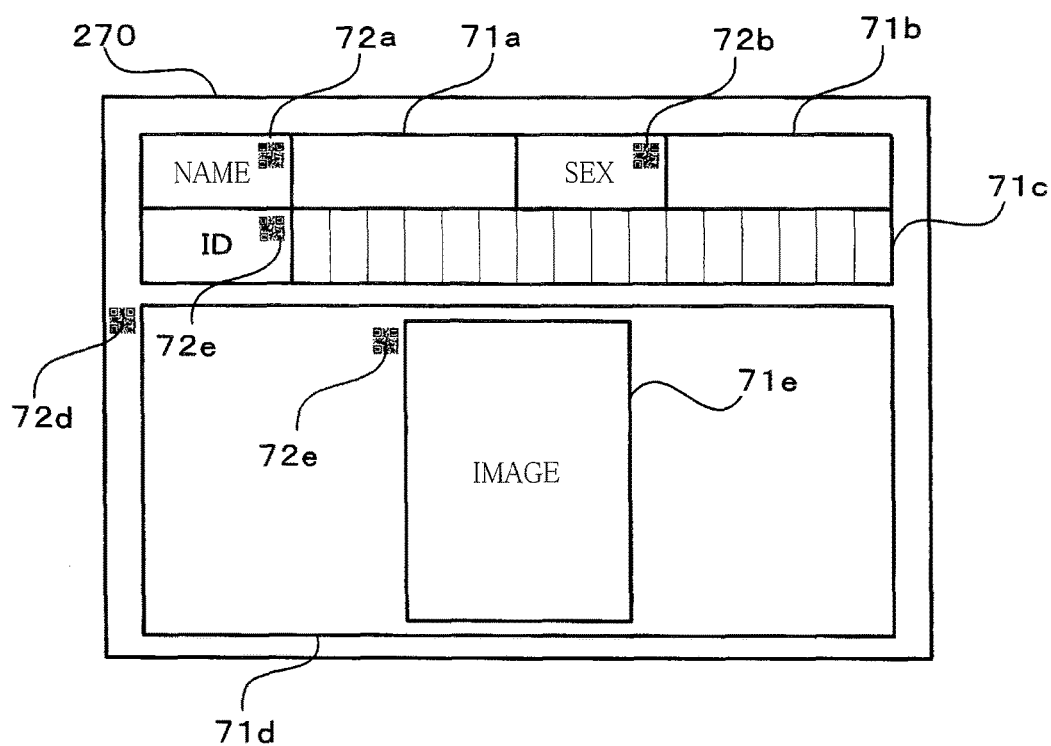
FIG. 7 is a view illustrating a card printed by an MFP according to a second embodiment.
Figure 8:
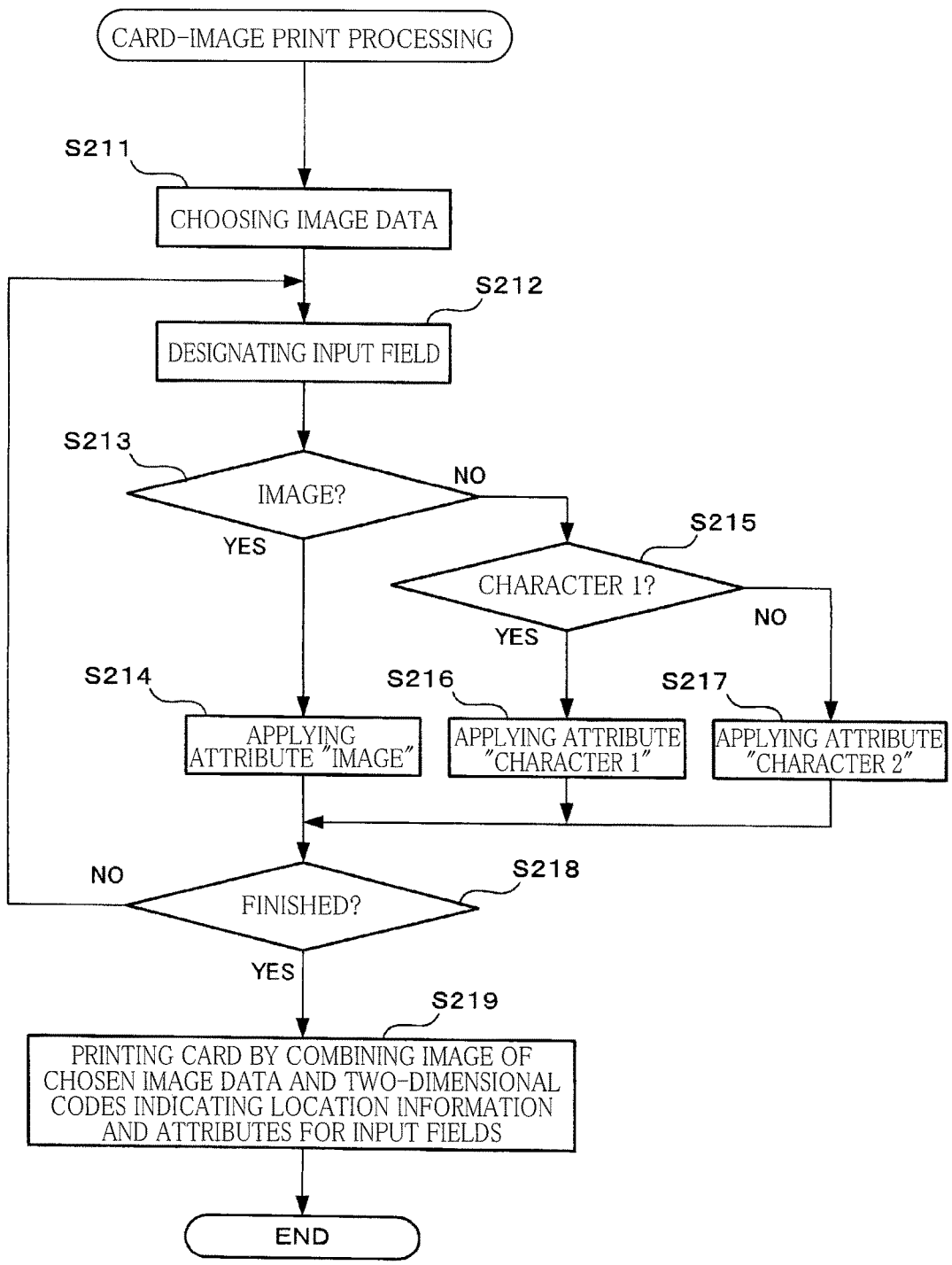
FIG. 8 is a flow chart illustrating a card-image print processing in the second embodiment.
Figure 9:
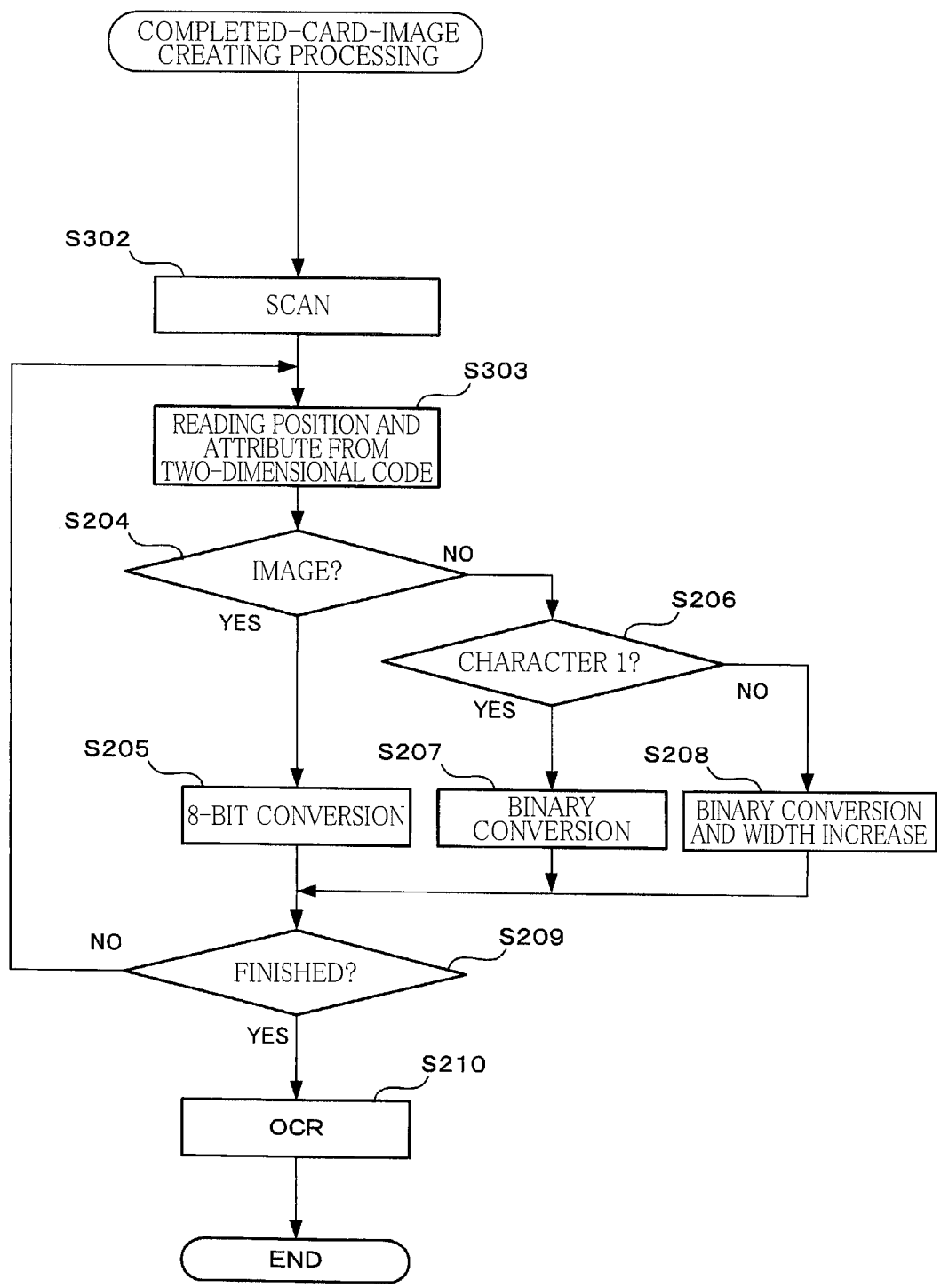
FIG. 9 is a flow chart illustrating a procedure of operations in a completed-card-image creating processing in the second embodiment.

There will be next explained a second embodiment with reference to FIGS. 7-9. It is noted that the same numerals as used in the first embodiment are used to designate the corresponding elements and steps of this second embodiment, and an explanation of which is dispensed with. In the present embodiment, the template database stored in the flash memory 54 contains only the second table 54e and does not contain the template data 54b. As illustrated in FIG. 7, the CPU 51 can print a card 270 such that two dimensional codes 72a-72e each as one example of an identification mark are arranged near the respective input fields 71a-71e. Each of the two-dimensional codes 72a-72e indicates the location information and the attribute (as one example of an image processing indicator in the present embodiment) of a corresponding one of the input fields 71a-71e. It is noted that the two-dimensional codes 72a-72e may be arranged at any locations as long as the location information is not indicated by coordinates relative to the two-dimensional codes 72a-72e. With this configuration, the location information and the attribute of each of the input fields 71a-71e can be acquired by reading the two-dimensional codes 72a-72e, eliminating the need to execute the template-data registering processing executed in the first embodiment. Instead, a card-image print processing for printing the card 270 is executed in this embodiment.

There will be next explained the card-image print processing with reference to FIG. 8. The card-image print processing begins with S211 at which the CPU 51 controls the touch panel 17 to display a list of image data which can be printed as the card 270, and prompts the user to choose one of the image data which is to be registered. It is noted that the image data which can be printed may be stored in advance in, e.g., the flash memory 54 and may be received from an external device via the network interface 55.

Processings at S212-S217 are similar to those at S102-S107 in the template-data registering processing in the first embodiment, and an explanation of which is dispensed with. The CPU 51 at S218 inquires of the user whether the user finishes designation of the input field or not. When the designation is not finished (218: NO), this flow returns to S212. When the designation is finished (S218: YES), the CPU 51 at S219 prints the card 270 by combining an image created based on the image data designated at S211 and images of the two-dimensional codes indicating the location information and the attributes related for all the input fields designated for the image data, and this flow ends.

There will be next explained a procedure of operations in a completed-card-image creating processing in this embodiment with reference to the flow in FIG. 9. The completed-card-image creating processing begins with S302 at which the CPU 51 executes the scan processing to create image data representative of the card 70. The CPU 51 at 5303 identifies the two-dimensional codes 72a-72e from the image data and reads the location information and the attribute of one of the input fields 71a-71e from the two-dimensional codes 72a-72e. As a result, the CPU 51 acquires the location information and the attribute of the one of the input fields 71a-71e. Processings at S204 and subsequent steps are similar to those in the completed-card-image creating processing in the first embodiment, and an explanation of which is dispensed with.

In the MFP 1 according to the present embodiment described above, the location information about each input field and the appropriate image processing for each input field are associated with each other by the template database 54a and the two-dimensional codes 72a-72e via the attribute. Accordingly, the CPU 51 can execute an appropriate image processing for each input field defined on the read image without complication of the processings.

Also, the location information and the attribute of each of the input fields 71a-71e can be read from the two-dimensional codes 72a-72e, eliminating the need of a storage capacity for the first table 54d.

It is noted that the two-dimensional code may indicate the location information and the type of the image processing. In this configuration, the template database does not need to store the second table 54e. That is, the template database 54a is not necessary.

The two-dimensional code is used as the identification mark in the present embodiment, but other marks such as a bar code may be used. Instead of the two-dimensional code, a storage device storing, e.g., the location information about the input fields 71a-71e may be mounted on the recording medium. For example, an IC tag bonded to a card may store the location information about the input fields 71a-71e and so on. In this configuration, the MFP needs to be provided with a reader for reading data stored in the IC tag.

<First Modification>

Figures 10, 11:
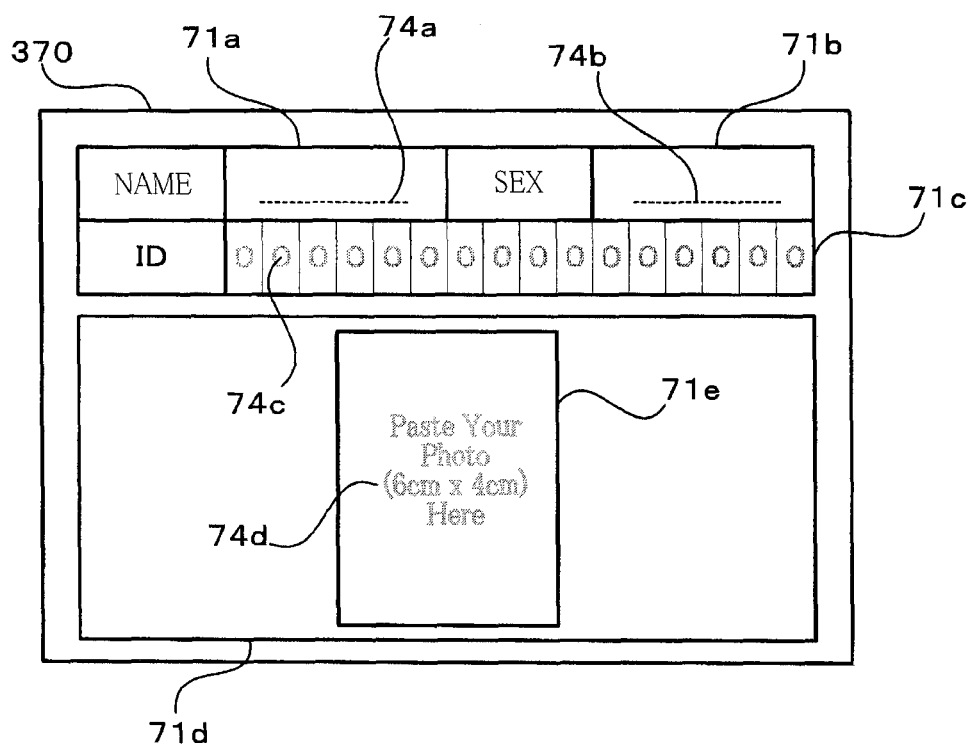
FIG. 10 is a view illustrating a template database in a first modification.
FIG. 11 is a view illustrating a card printed by an MFP according to a second modification.

In the first embodiment described above, the location information about the input fields 71a-71e and the types of the image processing are associated with each other using the attribute. In this modification, however, the attribute is not used, and the location information about the input fields 71a-71e and the type of the image processing (as one example of an image processing indicator in the present modification) are directly associated with each other. For example, as illustrated in FIG. 10, the flash memory 54 stores, as the template database, a table representing a relationship between the location information about the input fields 71a-71e and the types of the image processing. In this configuration, the type of the image processing is directly registered instead of the attribute in the template-data registering processing. This configuration reduces the number of references to the table, which simplifies the processing. Also, the CPU 51 may acquire, from an external storage device, data which contains information similar to that stored in the table in the present modification and in which the location information about the input fields 71a-71e and the types of the image processing (as one example of an image processing indicator in the present modification) are associated with each other.

<Second Modification>

In the present modification, as illustrated in FIGS. 10 and 11, when printing a card 370, the CPU 51 processes image data such that assistant images 74a-74d are formed on the respective input fields 71a-71d at a gray level value smaller than a predetermined threshold value. This predetermined threshold value is determined at a value that is lower than such a gray level value that an image having this value is completely deleted by the binary conversion for CHARACTER 1 and CHARACTER 2 (deleting processing). In other words, a threshold value of the deleting processing is determined at a gray level value higher than or equal to the predetermined threshold value. With this configuration, the assistant images which are not recognized even when the card 370 is read can be printed on the input fields 71a-71d in the completed-card-image creating processing, thereby assisting input operations of the user.

While the embodiments of the present invention have been described above, it is to be understood that the invention is not limited to the details of the illustrated embodiments, but may be embodied with various changes and modifications, which may occur to those skilled in the art, without departing from the spirit and scope of the invention. For example, the 8-bit conversion is assigned to the attribute "IMAGE", and the binary conversion to the attributes "CHARACTER 1" and "CHARACTER 2" in the above-described embodiment, but this configuration is one example of the image processing, and other image processings may be executed. For the attribute "IMAGE", for example, the CPU 51 may execute multi-value conversion greater than or less than the 8-bit (256-value) conversion and may execute no image processing. Also, the multi-value conversion may be executed for the attributes "CHARACTER 1" and "CHARACTER 2".

In the above-described embodiments, for the attribute "CHARACTER 2", the CPU 51 increases the line width after executing the binary conversion as the image processing. However, the CPU 51 may reduce the line width as the image processing and may execute other image processings including various image processings other than the multi-value conversion.

In the above-described embodiments, in the case where the input field partly or completely overlaps another input field, a higher priority is given to the attribute "IMAGE" than the attribute "CHARACTER 1" or "CHARACTER 2". However, a higher priority may be given to the attribute "CHARACTER 1" or "CHARACTER 2", and a priority for the attribute may be determined according to a relationship of inclusion of the input fields. For example, a higher priority may be given to an attribute of an input field included in another input field, and a higher priority may be given to an attribute of an input field including another input field.

While the template database and the second table are stored in the flash memory 54 in the above-described embodiment, the template database may be stored in an external device different from the MFP such as a file server and acquired via the network interface 55 in the completed-card-image creating processing. In this configuration, the flash memory 54 stores, instead of the template database, an address representative of a storage place of the template database.

In the above-described first embodiment, when the user chooses, in the completed-card-image creating processing, the image created based on the image data 54c used for printing the card 70, the user indirectly chooses the first table 54d of the template data 54b with the image data 54c.

However, the user may not choose the template data in the case where the MFP 1 stores only one template data 54b or in the case where the template data 54b is identified by, e.g., the two-dimensional code printed on the card or information stored in the IC tag bonded to the card.

The template data 54b is constituted by the image data 54c and the first table 54d, but the image data 54c does not need to be contained in the template data 54b. In this configuration, the template data 54b may contain information for identifying image data instead of the image data. Examples of the information for identifying image data include identification information for the image data (e.g., a file name) and an address representative of a storage place of the image data.

The user may perform an input operation in the template-data registering processing from an external device via the network interface 55.

While the MFP 1 includes the ink-jet printing mechanism in the above-described embodiment, a printing method is not limited as long as an image can be recorded on a sheet passing through the print area. For example, the MFP 1 may have a laser printing mechanism.

While the present invention is applied to the MFP in the foregoing explanation, the present invention is applicable to devices capable of executing the scan processing such as a facsimile machine.

What is claimed is:

1. A reading apparatus, comprising:
   a reading device configured to read an image on a recording medium and generate image data;
   a processor; and
   a memory configured to store a plurality of instructions, wherein the plurality of instructions, when executed by the processor, cause the processor to perform:
   retrieving a first two-dimensional code and a second two-dimensional code from the generated image data, the first and second two-dimensional codes being recorded on the recording medium;
   obtaining from the retrieved first two-dimensional code, (a) a first location information of a first partial image of the image read by the reading device, and (b) a first processing specifying information specifying an image processing for first partial image data corresponding to the first partial image, a position of the first partial image being indicated by the obtained first location information;
   obtaining from the retrieved second two-dimensional code, (a) a second location information of a second partial image of the image read by the reading device, and (b) a second processing specifying information specifying an image processing for second partial image data corresponding to the second partial image, a position of the second partial image being indicated by the obtained second location information;
   executing a binary conversion processing for the first partial image data, the binary conversion processing being specified by the first processing specifying information, the binary conversion processing being a conversion processing in which at least one pixel of the first partial image whose gray level value is less than a first gray level is deleted; and
   executing a first conversion processing for the second partial image data, the first conversion processing being specified by the second processing specifying information, the first conversion processing being different from the binary conversion processing.

2. The reading apparatus according to claim 1, wherein the first conversion processing is a multi-value conversion processing.

3. The reading apparatus according to claim 2, wherein the plurality of instructions, when executed by the processor, cause the processor to further perform a width change processing of increasing or reducing a width of a line in the first partial image.

4. The reading apparatus according to claim 2, wherein when the first partial image and the second partial image are at least partly superposed on each other on the image based on the generated image data, the plurality of instructions, when executed by the processor, cause the reading apparatus to perform the multi-value conversion processing on the second partial image data.

5. A non-transitory storage medium storing a plurality of instructions executable by a processor of a reading apparatus,
   wherein the reading apparatus comprises:
   a reading device configured to read an image on a recording medium and generate image data, and
   wherein the plurality of instructions, when executed by the processor, cause the reading apparatus to perform:
   retrieving a first two-dimensional code and a second two-dimensional code from the generated image data, the first and second two-dimensional codes being recorded on the recording medium;
   obtaining from the retrieved first two-dimensional code, (a) a first location information of a first partial image of the image read by the reading device, and (b) a first processing specifying information specifying an image processing for first partial image data corresponding to the first partial image, a position of the first partial image being indicated by the obtained first location information;
   obtaining from the retrieved second two-dimensional code, (a) a second location information of a second partial image of the image read by the reading device, and (b) a second processing specifying information specifying an image processing for second partial image data corresponding to the second partial image, a position of the second partial image being indicated by the obtained second location information;
   executing a binary conversion processing for the first partial image data, the binary conversion processing being specified by the first processing specifying information, the binary conversion processing being a conversion processing in which at least one pixel of the first partial image whose gray level value is less than a first gray level is deleted; and
   executing a first conversion processing for the second partial image data, the first conversion processing being specified by the second processing specifying information, the first conversion processing being different from the binary conversion processing.

* * * * *